E. F. HOWE.
VEHICLE POWER PLANT.
APPLICATION FILED APR. 1, 1913.
1,095,867.
Patented May 5, 1914.
3 SHEETS—SHEET 1.
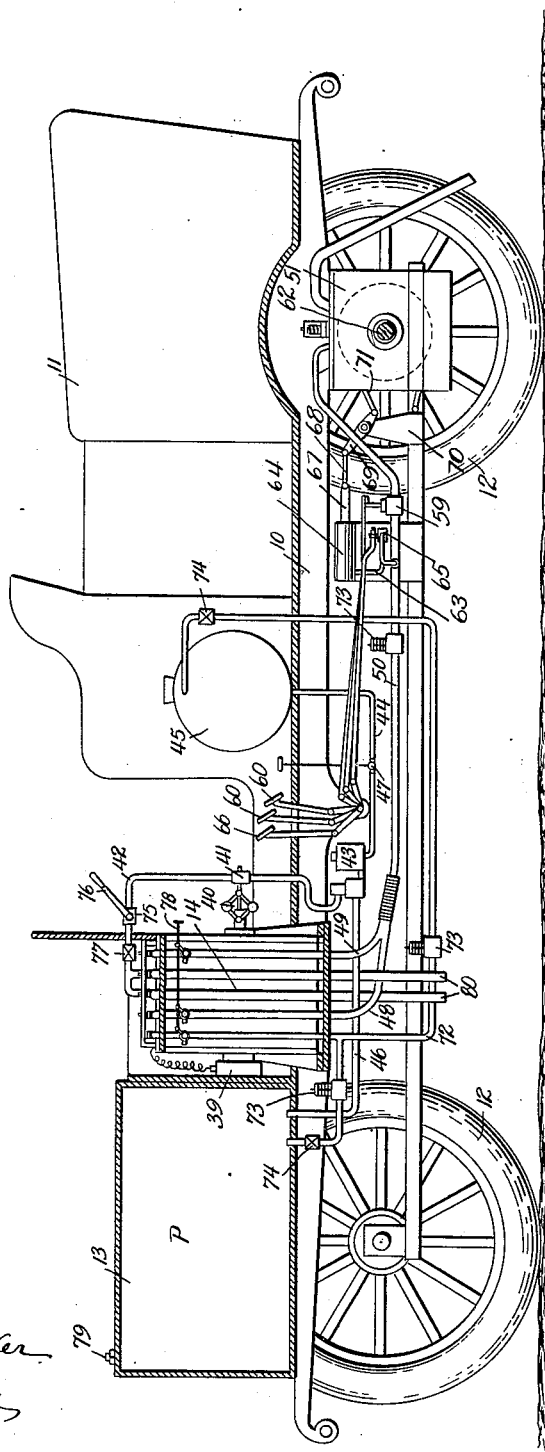
WITNESSES
H. J. Walker
B. Joffe
INVENTOR
Edgar F. Howe
BY Munn & Co
ATTORNEYS

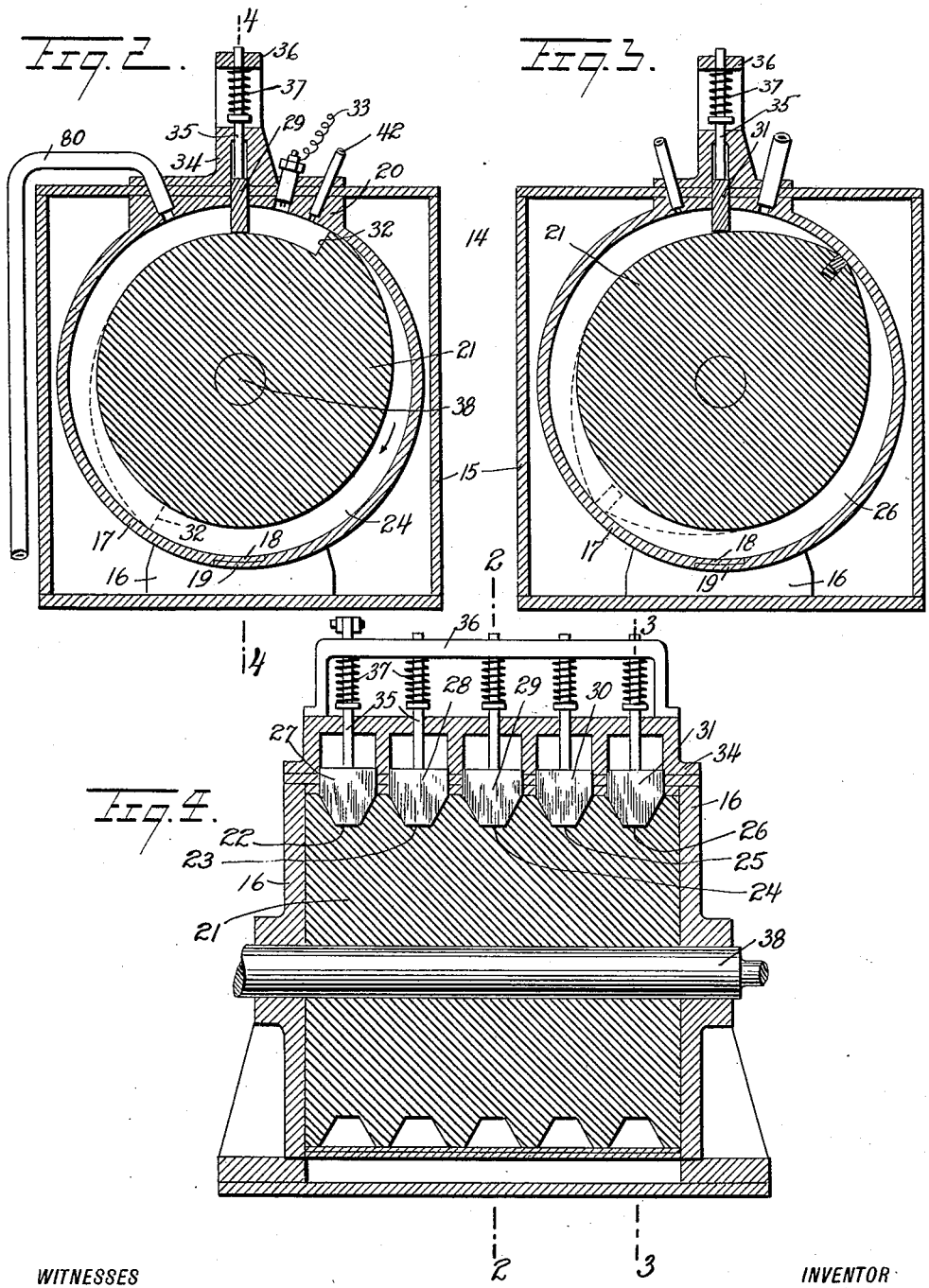

E. F. HOWE.
VEHICLE POWER PLANT.
APPLICATION FILED APR. 1, 1913.
1,095,867.
Patented May 5, 1914.
3 SHEETS—SHEET 3.
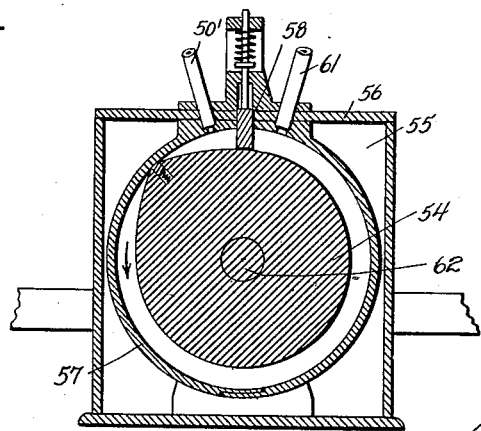
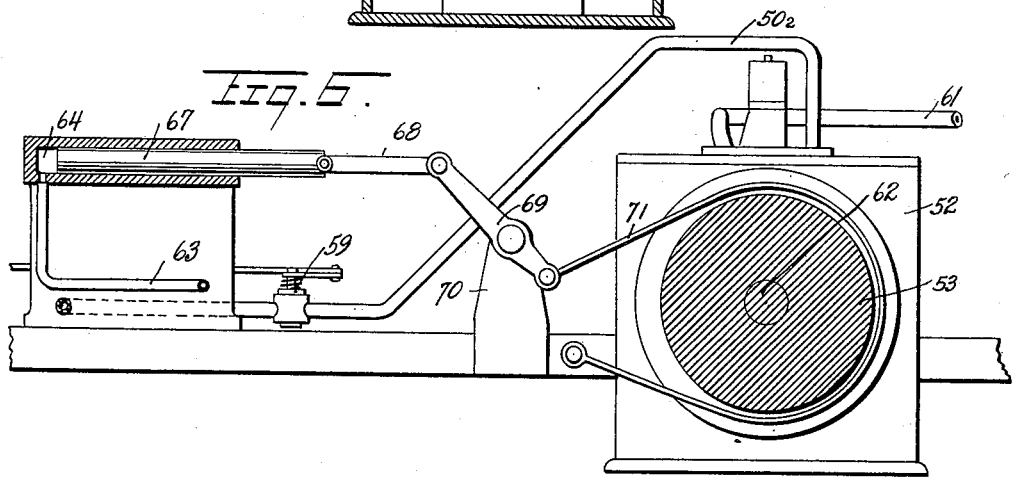
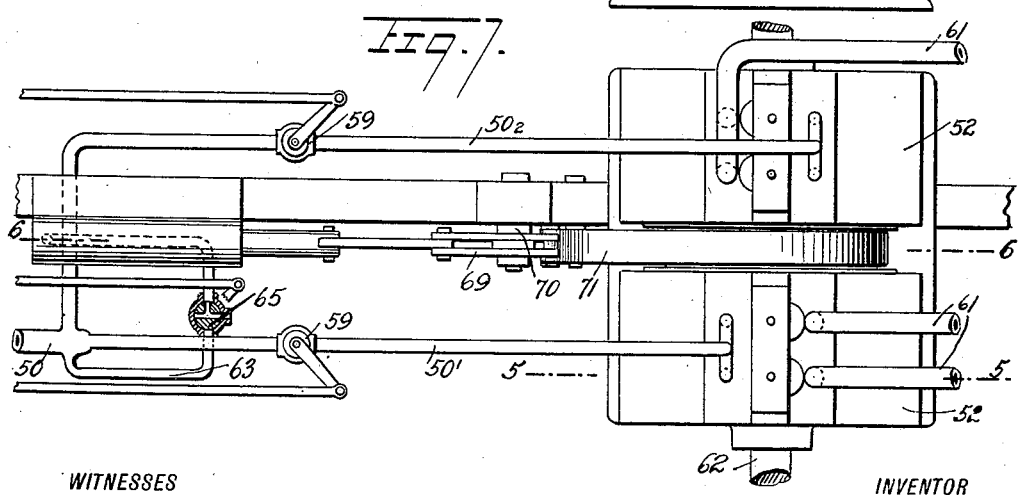
WITNESSES
H. J. Walker
B. Joffe
INVENTOR
Edgar F. Howe
BY Munn & Co
ATTORNEYS

UNITED STATES PATENT OFFICE.

EDGAR FOLLETTE HOWE, OF EL CENTRO, CALIFORNIA.

VEHICLE POWER PLANT.

1,095,867.   Specification of Letters Patent.   Patented May 5, 1914.

Application filed April 1, 1913. Serial No. 758,188.

*To all whom it may concern:*

Be it known that I, EDGAR F. HOWE, a citizen of the United States, and a resident of El Centro, in the county of Imperial and State of California, have invented a new and Improved Vehicle Power Plant, of which the following is a full, clear, and exact description.

In the present automobile power plant the transmission from the motive power generator to the wheels of the vehicle is obtained by a great number of elements interposed between the motive power and the wheels. These elements consume a great amount of the power derived from the generator, as the efficiency of any transmission by means of mechanical elements is low, particularly if gears are used in such a transmission. I am aware that a great number of liquid transmissions have been suggested to be interposed between the motive power generator and the wheels, but all of them require a large number of mechanical elements, and, consequently, the only advantage obtained is the large flexibility of the plant, with slight gain in power at the wheels.

To obviate the necessity of using a large number of mechanical elements for transmission between the motive power generator and the wheels of the vehicle, I have invented a simple and efficient vehicle power plant generating and using compressed fluid, the flexibility of which is well known and which does not require a large number of mechanical elements for its transmission. The plant comprises a rotary explosive engine, a fluid compressor and reversible fluid motor for propelling the vehicle.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a longitudinal section of a vehicle embodying my invention; Fig. 2 is a transverse section through the rotary explosive engine; Fig. 3 is a similar section through the fluid compressor; Fig. 4 is a longitudinal section through the structure of the combustion rotary engine and compressor; Fig. 5 is a transverse section through the air motor; Fig. 6 is a longitudinal section through the brake operating mechanism and brake; and Fig. 7 is a plan view of the reversible motor and the brake.

Referring to the drawings, 10 represents a chassis of an automobile of ordinary type provided with a body 11 of customary shape all mounted on wheels 12. The forward end of the chassis, where ordinarily the radiator and engine are positioned, is occupied by a storage tank 13 and a casing 14 of the rotary engine and compressor combined, respectively. The casing 14 is mounted similarly to the way the explosive engine is mounted on the chassis of automobiles. This casing 14 is formed of a rectangular shell 15 provided with end flanges 16. Inclosed in this rectangular shell, and between said end flanges 16, is a cylindrical shell 17, preferably formed of steel, and having its ends 18 and 19 overlapped, as seen in Figs. 2, 3 and 4. The upper lateral portion of the shell 17 is provided with a rectangular portion 20 extending through the entire length of the shell and secured to the upper, inner face of the rectangular shell 15. The inner lateral surface of the shell 17 is smooth and rotating within this shell is a rotor 21 provided with a series of lateral grooves 22, 23, 24, 25 and 26. The grooves 22, 23 and 26 are of the shape as shown in Fig. 3 and are engaged by abutments 27, 28 and 31. The grooves 24 and 25 of the rotor are of the shape as shown in Fig. 2 and are similarly engaged by abutments 29 and 30. The grooves 22, 23 and 26 constitute the portions forming three separate compressors, while the grooves 24 and 25 constitute the rotary explosive engines. The two engines formed in the rotor have their shoulder 32 at an interval of 180 degrees, consequently the explosion produced in the groove between the abutment and the shoulder by means of the spark plugs 33 is at intervals of half a revolution.

All of the abutments engaging the rotor 21 are incased in a member 34 attached to the upper surface of the upper side of the rectangular shell 15. This member is provided with housings, one for each abutment, in which each of the abutments can reciprocate when the rotor displaces it, according to the form of the grooves it engages. Every abutment is provided with a stem 35 projecting through the upper portion of the member 34 and through the bracket 36 positioned on the top of the member 34. Each of these stems 35 is provided with a collar above the upper portion of the member 34, and supported on this collar is a coil spring 37 which abuts with its upper end against the bracket 36. Normally, therefore, the tendency of the spring is to force each of the abutments against the bottom of the groove of the rotor. The grooves 23 and 26 forming the compressors are also made so that their points, contacting with the inner surface of the shell 17 are opposite each other, thereby producing a more uniform compression. The rotor 21 is rigidly secured to a shaft 38 projecting through the side flanges 16 and having bearing supports therein. The end of the shaft disposed toward the storage tank 13 carries a magneto 39 for generating the sparks in the spark plugs 33 provided in the rotary explosive engines. The opposite end of the shaft is provided with a ball governor 40 controlling directly the valve 41 positioned on the pipe 42 through which the gasolene is supplied from the carbureter 43 to the rotary explosive engines.

The carbureter 43 is connected by means of a pipe 44 to the gasolene supply tank 45 and by means of a pipe 46 to the storage tank 13. A valve 47 is provided on the pipe 44 which can be controlled from the driver's seat.

The compressors formed by the grooves 23 and 26 of the rotor are each provided with a delivery pipe 48 and 49 uniting in a single pipe 50 leading to the reversible motor 51 mounted on the rear axle 62 of the vehicle. The reversible motor 51 is formed of two similar parts 52 intermediate which a brake drum 53 is formed, the brake drum 53 being integral with the rotor 54 of the reversible motor. The structure of the parts 52 is exactly the same as the casing 14; it comprises end flanges 55 similar to flanges 16, a rectangular shell 56 similar to shell 15, an inner circular shell 57 similarly constructed, but smaller in size, and similarly attached to the shell 56 and end flanges 55. The lateral grooves formed in the rotor 54 are similar to the grooves 22, 25 and 26 formed in the rotor 21. The abutment 58 engaging the groove of the rotor 54 is of similar construction and operates similarly, as disclosed in connection with the casing 14. The difference between the two parts 52 of the reversible motor is that the pipe 50, leading the compressed fluid to the motors, is at one end positioned at the right of the abutment 58 and in the other side at the left, so that one side will drive the vehicle forward and the opposite side, rearward. The pipe 50 leading to the reversible motor is branched into two parts $50_1$ and $50_2$, each provided with a valve 59 operated by a pedal 60, the branch $50_1$ leading to the forward moving motor and the branch $50_2$ to the rearward, so that each of these motors can be operated independently by means of their respective pedals 60. Each of the members 52 is provided with exhaust pipes 61 through which the expanded air is exhausted. The compressed fluid supply pipe 50 is also provided with a branch pipe 63 leading to the rear of a cylinder 64 and has a three-way valve 65 controlled by means of the pedal 66. Engaging the cylinder 64 is a plunger 67 projecting out of the cylinder 64 and having a link 68. The link 68 is connected to one end of a first-class lever 69 mounted on a standard 70 attached to the longitudinal bar connecting the two axles and to which the cylinder 64 is also secured. The opposite end of the lever 69 is connected to one end of the brake band 71 which encircles the drum 53, the other end of the band being attached to the chassis. From this it can be seen that when the three-way valve 65 is operated the compressed air admitted into the cylinder 64 forces the plunger 67 out, thereby gripping the brake drum 53 by means of the band 71. The action being well known, no description is necessary for same.

The compressor formed by the groove 22 has its compressed fluid outlet 72 branched out to the supply tank 13 and to the fuel supply tank 45, so that it constantly supplies compressed fluid to the supply tank 13 and above the gasolene in the tank 45. All of the compressed fluid pipes are provided with relief valves 73, which control the pressure in the pipes and let the excess of same escape into the atmosphere. The pipe 72 near the tank 45 and the tank 13 is provided with a check valve 74 so that the compressor can send air into the tanks without receiving any back pressure. The supply pipe 42 is also provided with a valve 75 controlled by means of a lever 76 from the driver's seat; and in front of said valve 75 and said supply pipe 42 is a check valve 77 which prevents back pressure from the explosive chambers of the rotary engines. The three compressed fluid outlets 48, 49 and 72 are each provided with a three-way valve controlled by a single lever 78, so that each of the outlets communicate with the atmosphere when said lever 78 is operated. The purpose of this will appear hereinafter.

The operation of my new power plant is as follows: In a new vehicle the air is first stored in the supply tank 13 through the plug 79, then the lever 78 is operated so as to connect all of the compressors with the atmosphere. The air from the supply tank is admitted through the pipe 46 to the carbureter 43, which becomes saturated with gasolene; and through the pipe 42 it is admitted to the grooves 24 and 25 by operating the valve 75 by means of the lever 76.

This compressed air will, necessarily, when entering between the shoulder 32 of the grooves and the abutments 29 and 30, cause the rotation of the rotor, which, in turn, causes the rotation of the shaft 38. The rotation of the shaft 38 generates the current in the magneto, producing a spark in proper time in the space between the shoulder and the abutment 29 or 30 by means of the spark plug 33. This will start the engine. Therefore, the rotary engine is started by means of stored compressed air in the tank. When the engine rotates the exhaust of same flows out through the exhaust pipes 80 into the atmosphere. The position of the shoulders 32 in the two adjacent grooves 24 and 25 forming the rotary explosive engines, being diametrically opposite, causes the explosion, as before stated at intervals of half a revolution, thereby making the motion of the engine uniform. When the engine is running as described, the lever 78 is operated, cutting off the connection between the pipes 48, 49 and 72 and the atmosphere; this causes the compressors formed by the grooves 22, 23 and 26 to compress the air. The compressors formed by the grooves 23 and 26 send the air through the pipe 50 to the reversible motor, which, in turn, receives this compressed air through the inlet $50_1$, for example, between the portion contacting with the inner lateral surface of the shell 57 and the plug 58, causing the same to rotate in the direction indicated by the arrow in Fig. 5. The rotation of the rotor 54 causes the rotation of the shaft of the rear axle 62 on which the rear wheels 12 are mounted. The amount of air supplied by the reversible motor to the parts 52 depends upon the amount of opening of valves 59 which are operated by pedals 60; and the pressure in the pipe 50 depends on the valve 73. By means of this the speed of the reversible motor can be varied, that is, according to the pressure in the pipe and the amount of air admitted through the pipe $50_1$, for example, to the rotor, so that variable speeds can be obtained by means of valve 59 without having any extra elements for transmission. Similarly, the speed of the rotary engine can also be controlled by means of the pressure obtained by the compressor formed by groove 22 and abutment 27. That is, if the resistance of valve 73 positioned on the pipe 72, through which the compressed air from this compressor flows, is increased, the pressure in same will be increased and the stored air in tank 13 will be at a higher pressure. Similarly, the flow of gasolene from tank 13 will be under higher pressure, which will cause higher explosive force and, consequently, more power from the rotary engine. The uniform motion of the rotor 21 is obtained by means of the regulator 40 controlling the supply to the rotary engine by means of valve 41. This can be adjusted within the desired degree. It may also be remarked that in using the rotary engines, compressors and motors, I reduce the number of mechanical elements in comparison with the reciprocal types in use, and, consequently, the strain on the parts of the machinery is greatly reduced.

Having thus described my invention, what I claim and desire to secure by Letters Patent is:

1. In a vehicle power plant, a rotary explosive engine; a rotary fluid compressor, both having a common rotor and casing; and a reversible rotary fluid motor comprising two similarly formed parts, one for direct and the other for reverse motion, and having a brake mechanism intermediate said two parts.

2. In a vehicle power plant, a rotary explosive engine; a rotary fluid compressor, both having a common rotor and casing; and a reversible rotary fluid motor comprising two similarly formed parts, one for direct and the other for reverse motion, having a brake mechanism intermediate said two parts, said brake mechanism being operated by the compressed fluid driving said reversible motor.

3. In a vehicle power plant, a rotary explosive engine; a rotary fluid compressor, both having a common rotor and casing; a reversible rotary fluid motor receiving the compressed fluid from said compressor for propelling the vehicle; a brake mechanism on said reversible motor similarly operated by the compressed fluid from said compressors; and means interposed between said compressor, reversible motor and brake for controlling the flow of compressed fluid to said motor and brake.

4. In a vehicle power plant, a casing inclosing a circular shell; a rotor in said shell having a plurality of lateral grooves; an abutment for each of said grooves projecting through said shell into said casing; means for normally forcing each of said abutments into corresponding grooves, some of said grooves in combination with said abutments on said shell forming rotary explosive engines, and the other of said grooves, in combination with the corresponding abutments, forming compressors; a compressed fluid storage tank; a fuel tank, each of said tanks receiving the compressed air from one of said compressors; a carbureter having means connecting it to said storage tank, said gasolene tank and to said rotary explosive engine, said connection from said carbureter to said rotary explosive engine controlled by the engine and a reversible rotary fluid motor of the vehicle for propelling the vehicle, receiving the compressed fluid from the other of said compressors and having a brake mechanism operated by the compressed fluid of the said compressors operating said motor.

5. In a vehicle power plant, a casing comprising a circular shell; a rotor in said shell having a plurality of lateral circular grooves; an abutment for each of said grooves, some of said grooves in combination with said abutment and said shell forming rotary explosive engines, the other of said grooves in combination with the corresponding abutment and the said shell forming rotary compressors; and a reversible rotary fluid motor having a fluid brake mechanism thereon.

6. In a vehicle power plant, a casing inclosing a circular shell; a rotor in said shell having a plurality of lateral grooves; an abutment for each of said grooves; means for normally forcing each of said abutments into the corresponding grooves, some of said grooves in combination with said abutments on said shell forming the rotary explosive engines, the others of said grooves in combination with the corresponding abutments forming compressors; a reversible rotary fluid motor mounted for propelling the vehicle and adapted to receive the compressed fluid from the other of said compressors; and a brake mechanism on said motor operated by the compressed fluid from said compressor.

7. In a vehicle power plant, a rotary explosive engine; a rotary fluid compressor, both having a common rotor and casing; a reversible rotary fluid motor receiving the compressed fluid from said compressor for propelling the vehicle; and a brake mechanism associated with said reversible motor and operated by compressed fluid from said compressor.

8. In a vehicle power plant, a casing inclosing a circular shell; a rotor in said shell having a plurality of lateral grooves; an abutment for each of said grooves projecting through said shell into said casing; means for normally forcing each of said abutments into corresponding grooves, some of said grooves in combination with said abutments and said shell forming rotary explosive engines, the other of said grooves in combination with the corresponding abutments forming compressors; a compressed fluid storage tank; a fluid tank, both of said tanks receiving the compressed air from one of said compressors; a reversible rotary fluid motor formed of two parts, one for direct and the other for reverse motion, mounted to propel the vehicle and receiving the compressed fluid from the other of said compressors; and a brake mechanism on said motor operated by the compressed fluid.

In testimony whereof I have signed my name to this specification in the presence of two subscribing witnesses.

EDGAR FOLLETTE HOWE.

Witnesses:
PARKER EARL BAIRD,
FRANK ERZINGER.

Copies of this patent may be obtained for five cents each, by addressing the "Commissioner of Patents, Washington, D. C."